United States Patent [19]

Gauchel et al.

[11] Patent Number: 4,822,439
[45] Date of Patent: Apr. 18, 1989

[54] PROCESS FOR FORMING THICK BALLISTIC RESISTANT MATERIALS

[75] Inventors: James V. Gauchel; Edward L. Wilson, both of Newark; Edward J. Kerle, Granville; Terry R. Beaver, Nashport, all of Ohio

[73] Assignee: Owens-Corning Fiberglas Corporation, Toledo, Ohio

[21] Appl. No.: 88,637

[22] Filed: Aug. 24, 1987

[51] Int. Cl.$^4$ .............................. B29C 45/00
[52] U.S. Cl. .................... 156/285; 264/102; 264/553; 428/911; 523/511
[58] Field of Search ............ 428/911; 525/19; 523/501, 505, 511; 156/245, 285–286; 264/101, 102, 553

[56] References Cited

U.S. PATENT DOCUMENTS

| | | | |
|---|---|---|---|
| 2,568,331 | 9/1951 | Frilette | 260/40 |
| 3,431,320 | 12/1967 | Baum et al. | 260/865 |
| 3,465,061 | 11/1967 | Fekete et al. | 260/865 |
| 4,100,229 | 7/1978 | Schwartz, Jr. | 523/511 X |
| 4,101,604 | 7/1978 | Rowe | 525/19 X |
| 4,110,278 | 8/1978 | Demmier et al. | 523/511 X |
| 4,138,385 | 2/1979 | Uffner et al. | 525/17 X |
| 4,290,939 | 9/1981 | Bertsch et al. | 525/438 X |
| 4,403,012 | 9/1983 | Harpell et al. | 428/290 |
| 4,529,640 | 7/1985 | Brown et al. | 428/116 |
| 4,555,534 | 11/1985 | Atkins | 523/511 X |
| 4,639,387 | 1/1987 | Epel | 428/113 |
| 4,664,967 | 5/1987 | Tasdemiroglu | 428/220 |

OTHER PUBLICATIONS

MIL-L-62474 B (AT) Military Specification 25 Jun. 1984 "Laminate:Aramid-Fabric-Reinforced, Plastic".
Ballistic impact behavior of "High Strength Glass Fiber Composites" Jan. 27, 1986 D. R. Hartman.
"Discover S-2 Glass Fiber a new state of the art" Owens-Corning Fiberglas Corporation Publication 5-ASP-1301, 1985.
"Peroxyesters" Penwalt Product Bulletin #7-81-M.
"Thickners and Low Shrink Additives for Premix and SMC Systems" Frank Fekete, SPI 1970.
"Monthly Report-Jun. 1985" Army materials and Mechanics Research Center, Contract #DAAG-46-8-5-C-0006.
"A Comparative Study of Ballistic Performance of Ballistic Performance of Glass Reinforced Plastic Materials", by Arakere Vasudev and Mitchell J. Mehlman, SAMPE Quarterly, Jul. 1987.
"Ballistic Performance of Thick S-2 Glass Composites" by Bless, Hartman and Hanchak.
"Ballistic Penetration of S2 Glass Laiminates" by Bless, Hartman, Okajima and Hanchak.

*Primary Examiner*—Michael W. Ball
*Assistant Examiner*—David Herb
*Attorney, Agent, or Firm*—Patrick P. Pacella; Ronald E. Champion

[57] ABSTRACT

A process is provided for manufacturing ballistic resistant composites of an isophthalic thermoset polyester and woven roving made of magnesia aluminosilicate glass fibers. An impregnating solution is provided whereby prepregs can be conveniently formed and then vacuum bag molded. The ingredients i the impregnating solution are critically selected to provide prescribed viscosities after the elapse of certain periods of time and thereby allow the final articles to be formed in an economical and expedient manner.

14 Claims, No Drawings

4,822,439

PROCESS FOR FORMING THICK BALLISTIC RESISTANT MATERIALS

GOVERNMENT CONTRACT

This invention was made with Government support under Government Contract No. DAAG 46-85-C-0006 awarded by the Department of the Army (Army Materials and Mechanics Research Center). The Government has certain rights in this invention.

TECHNICAL FILED

The present invention relates to a process for forming fiberglass composite articles and more particularly it relates to a process for forming fiberglass composite articles which have ballistic resistant properties and which composites may be employed as liners or as structural armor.

BACKGROUND OF THE ART

Ballistic resistant articles which contain high strength fibers for use as structural members and panels, like spall suppression liners, for a variety of military applications are known. Thus far, one of the most successful fibers is a polyaramide, more specifically poly(-phenylenediamine terephthalamide). Such filters in fabric form are in their usual method of use encapsulated or embedded in a composite article of a thermoset resin. Military Specification MIL L 62474B provides a one such laminate or composite employing a polyaramide and a laminating resin which is the cured reaction product of polyvinyl butyral, phenol formaldehyde, and trimethylol phenol and phthalic anhydride. Such laminates have utility for armor applications and spall liners, but one of their more notable deficiencies is that they are not easily machined.

In order for a composite to have its broadest application for a wide variety of ballistic resistant applications, it is important that it possess a wide balance of important properties. The properties include, of course, proper ballistic performance; that is the composite functions satisfactorily as a ballistic system be it structural armor or a liner. Other required properties are that the material be stiff and self-supporting, fire-resistant, smoke-resistant, non-toxic, machinable and that it be capable of being cut, trimmed and drilled with, if need be, carbide or diamond tips. Since one of the uses may be structural armor it is important that the materials and fabrication process be capable of producing thick composites.

A composite having these properties has been identified and is formed from woven glass roving made from high strength magnesia aluminosilicate glass fibers and an unsaturated isophthalic-maleic-propylene glycol polyester resin which can be cured to a thermoset condition with styrene and a free radical peroxide initiator. A resin solution (E-701 available from Owens-Corning Fiberglas Corporation) which has been identified as producing quite satisfactory results is a system of a low acid number polyester namely one having an acid number less than about 12.5. Unfortunately, ballistic resistant composites of this type have only been made by a manual hand layup technique because of the properties of that resin system. This technique is not well adapted for the reliable production of such composites in an expedient commercial and economical manner.

In accordance with the present invention as economical and commercially satisfactory process is provided for manufacturing such composites especially composites of substantial thickness. Typically the composites can be formed having thicknesses on the order of at least about ⅛ inch and the process is surprisingly capable of producing high quality composites having thicknesses of ½ inch, ¾ inch, and higher, up to and including 2½ or even 3 inches in thickness. Additionally, the process can be practiced so as to form rectilinear or curvilinear materials. Thus any of the wide variety of shapes needed for a wide variety of military applications including, for example, tank turrets can be expediently manufactured by the present process. Those skilled in the art will readily appreciate the significance, and unexpectedness of being able to form thick rectilinear and curvilinear ballistic resistant materials. Considering the fact that the resin is cured by the use of monomeric styrene and a free radical initiator, one would not expect that such thick composites could be expediently formed because of problems with their cracking internally as a result of the exothermic reaction.

DISCLOSURE OF THE INVENTION

The present invention uses widely available, conventional equipment of the type previously employed to form sheet molding compound. The equipment is first of all employed to form a prepreg but with a specifically formulated coating or impregnating resin solution. The prepregs are then stacked to the thickness desired and vacuum bag molded to the final desired composite configuration. The impregnating solution is specifically formulated to provide an impregnating composition having certain needed preselected properties at certain preselected periods of time, including the ability to flow well so as to conform, in a vacuum bag molding operation, to the desired configuration at a low temperature, for example, about 140° to about 150° F. and prior to the initiation of the curing reaction. In passing, those skilled in the art will recognize, considering the specifically selected and important peroxide initiator employed, that while there may be some slight cross-linking reaction initiation in that low temperature range, it is really not initiated since it is essentially not measurable, is not self sustaining and does not adversely affect flowout during the molding. When reference is made to initiation of curing or of cross-linking, therefore, this means heating to a temperature, about 165° F., where the reaction is essentially triggered, with a dramatic increase in rate, and self sustaining to provide a cure and increase in viscosity. In order to have a commercially expedient process it is important that the prepreg material be capable of being subjected to a vacuum bag molding operation both reasonably promptly after the prepreg has been formed and, optionally, after it has been stored for up to 30 days at room temperature. In operating such a process it is important for smooth expedient operation that the impregnating composition be of a sufficiently high viscosity to conveniently handle the composition during impregnating and yet not be of such a high viscosity that impregnation, or coating, of the woven roving is essentially ineffective. A short period of time after impregnation the composition must have a viscosity much higher than during impregnation. This viscosity must then be sufficiently high to allow for the release of the composition from a supporting releasable plastic film.

The process uses a moving conveyor and a continuous plastic film, e.g. a polyolefin but preferably a coextrusion of a polyolefin and nylon (polyamide) is supplied to the conveyor from a roller. As the conveyor moves, along with the film that it carries, the impregnating composition is discharged onto the film and the woven glass roving is then embedded into the impregnating composition layer and impregnation of the glass fibers is thereby effected. These materials are then supplied to compression rollers which, so to speak, dry the materials by compressingly removing excess liquid impregnating solution. The impregnated prepreg material exiting from the compression rollers is then wound in the form of a roll. From the time the impregnating composition is prepared up to the time that impregnation is substantially completed, as by passage through the compression rolls, involves the passage of less than approximately 27 minutes when typical equipment is employed. As indicated above it is important to be able to mold the prepreg material reasonably promptly after its formation and collection as a roll. In a practical operation using such typical equipment, this means that about 10 minutes after impregnation the prepreg material should be in a condition for molding. This, in turn, means that after that 10 minutes interval, the supporting plastic film upon which the prepreg was formed must be capable of being conveniently removed from the prepreg material. This requires the impregnating composition to have a minimum viscosity value at that time. That is, if the viscosity is too low the film can not be acceptably removed. Moreover since it is also important to be able to store the prepregs for up to 30 days or so before molding, it becomes important, as a practical matter, that the impregnating composition in the prepregs after one day have a relatively high viscosity and one which is substantially constant. Otherwise the composition would not be stable in storage at room temperature and the resin would flow within the package causing an unacceptable variation in the resin/glass fiber ratio of the material. Finally, during molding it is also important that the impregnating composition be capable of flowing at a low temperature in a vacuum bag molding operation to conform to the mold shape and that this be done at a temperature lower than that needed for initiation of the curing reaction. Furthermore, it is important that the free radical initiator be selected such that the initiation and exotherm of the reaction is not too violent and is reasonably self-controlling to thereby allow the formation of thick composites. Thus it has been found important to have the ability to vacuum bag mold by first of all molding the prepreg materials at 140° F. to 150° F. for a sufficient period of time to allow flowout but without causing the reaction to initiate (i.e. not proceed at a rate which is self sustaining) and then to further heat to trigger the initiation of the curing reaction, at about 165° F., so that the reaction rate dramatically increases and the reaction become self sustaining.

Thus in order for the process to be expediently run it is important that the impregnating composition first of all have a viscosity of in excess of about 500 centipoise (cps) and up to about 4000 cps during impregnating and that it have a viscosity in excess of about 15000 cps within no more than about 10 minutes after impregnation. Viscosities during impregnation which are lower, will be too soupy or fluid for convenient handling and the impregnation will generally be ineffective if the viscosities are higher. A surprisingly low viscosity of in excess of about 15000 cps is needed to allow the plastic film to be conveniently released from the prepreg material. The viscosity of the impregnating composition needs to be in excess of about 50,000 cps and up to about 500,000 cps after the elapse of no more than about one day and this viscosity level should be substantially constant over about a 30 day period. The prepreg material can then be stored after about one day with little fear of impacting on the process or the quality of the impregnation over a 30 day period. Again, as indicated above, in order to allow for the formation of thick high quality curvilinear and rectilinear shapes, it is important that the impregnating resin solution have good flowout at about 140° to about 150° F. and that the initiation of the curing reaction takes place at a higher temperature and without a violent uncontrolled exotherm. Viscosities of between about 3000 to about 10,000 cps in the 140° F. –150° F. range are suitable.

An impregnating solution having all of the above noted important characteristics and which yet provides a final composite having all of the properties necessary for the article to satisfactorily perform as a ballistic resistant material is formed by combining (i) calcium hydroxide, and (ii) 2,5-dimethyl-2,5-bis-(2-ethylhexanoylperoxy) hexane, (hereinafter 2-5 Initiator) or the 2-5 Initiator and tertiary butyl perbenzoate (TBPB), and (iii) water, or glycerin, or a mixture of water and glycerin, (iv) optionally alpha-methyl styrene, with (v) a solution of a low acid number isophthalic-maleic-propylene glycol polyester resin in a solvent of monomeric styrene or a solvent which is a mixture of monomeric styrene and monomeric diallyl phthalate. The amount of calcium hydroxide [as 100% Ca(OH)$_2$]will be in the range of about 0.5% to 4% by weight (based on the resin solution). The water or glycerin or the combined mixture of water and glycerin will be present in the amount of about 0.02% to about 1.0%. These amounts of calcium hydroxide and the water and/or glycerin are important in order to reliably provide the viscosity controlled impregnatinng composition with the important properties noted above. When used alone the 2-5 Initiator will desirably be present in an amount of at least about 0.05% by weight but less than about 1.0% by weight (based on resin solution) when forming laminates with a thickness of less than about ¾ inch, and about 0.05% to about 0.5% when forming laminates having a thickness greater than about ¾ inch. When 2-5 Initiator and TBPB are used together the total amount of total initiator will also be as set forth above for the 2-5 Initiator. They, of course, may be added to the resin solution individually or together. Generally the TBPB is used to ensure obtaining a complete ultimate cure of the polyester and when present will be used in amounts effective to obtain complete cure. Complete cure generally means obtaining a cured condition of the polyester such that the glass transition temperature is within about 10 centrigrade degress of the maximum obtainable glass transition temperature. TBPB is especially advantageously employed when diallyl phthalate is employed. TBPB will be present between 0 to about 0.6% (based on resin solution) depending on laminate thickness. It has been observed that employing amounts greater than that produces an exothermic reaction which is too vigorous.

The peroxy initiator system employed is highly important and uniquely adapted to the present invention. This initiator system, because of its extremely low rate of decomposition at the molding temperature (140°–150° F.), does not cause any interference with molding of the resin system when the viscosity of resin system is decreased (by heating to that molding temperature) to allow for good flow. Yet the system when further heated (about 165° F.) exhibits a sharp and dramatic increase in the rate of decomposition which provides for a highly efficient self-sustaining, curing reaction which imparts complete cure to the polyester of the final laminate even under low temperature cure cycles. Becuase of this efficiency smaller amounts of initiator are satisfactory and provide good self-control over the reaction exotherm without consequential adverse impact on final product qualities.

The amount of impregnating composition employed will be selected so that the finally cured composite or laminate contains about 60 to about 75% by weight of the woven glass roving. In general a sufficient number of plies of prepregs will be vacuum bag molded to provide a file composite thickness of about ⅛ inch. Of course, as indicated, thicker composites are possible and the process is capable of producing composites in excess of about ¾ inch up to, for example, three inches.

BEST MODE AND INDUSTRIAL EXPLOITATION OF THE INVENTION

As used herein the term isophthalic-maleic-propylene glycol polyester refers to a low acid number polyester that is one generally having an acid number of less than about 12.5. The polyester is an unsaturated thermosettable polyester which can be formed from isophthalic acid, maleic anhydride and propylene glycol. The terminology acid contemplates the anhydride and vice versa. It will also be apparent that the polyester can be formed by reacting esters of such anhydrides or acids and esters of propylene glycol as well. The resin solution, that is the isophthalic-maleic-propylene glycol polyester resin and styrene (or the mixture of styrene and diallyl phthalate) will be about 53 to about 70% by weight of the resin and the resin solution typically will have a viscosity on the order of 300 to about 1500 centipoise. When diallyl phthalate is employed the viscosity will be in the higher end of the range. Typically when styrene is used, to the exclusion of the diallyl phahalate, the viscosities of the solution will be around 300 to 600 or 700 cps. If diallyl phthalate is employed along with styrene as the solvent and polymerizable monomer, the ratio of diallyl phthalate to styrene will generally be less than about 2:5 (on a weight basis). A suitable low acid number unsaturated thermosettable isophthalic-maleic-propylene glycol polyester is available from Owens-Corning Fiberglas Corporation under their designation E-780 polyester resin. The E-780 polyester resin is free of any amine accelerators, for example, aniline or substituted anilines, as they have an adverse impact on the needed control of thickening. Such accelerators are commonly employed to accelerate the polyester and styrene reaction. An amine free resin solution which is also suitable but which has a lower non-volatiles content is E-701 also manufactured by Owens-Corning Fiberglas Corporation. These materials have acid numbers ranging between about 7 to about 12.5 and typically less than about 9. E-780 is nominally about 34% styrene whereas the amine-free E-701 is nominally 45%.

The calcium hydroxide which, along with the water, (or glycerin or mixture of water and glycerin) controllably thickens the resin solution to provide the needed viscosities at the various critical times, can be of any source. Preferably, however, the material will be that available from Plasticolors, Inc. under their designation PG-9104. This material contains about 30% by weight of active calcium hydroxide in a non-thickening oligomeric styrene grinding paste.

If alpha-methyl styrene is employed in the composition it generally will be employed in an amount less than about 3% by weight. While not needed this material has been noted as somewhat effective suppressing the intensity of the curing exotherm.

The low acid number polyester is of significance because higher acid number polyesters are generally more sensitive to small changes or fluctuations in processing conditions. The present system is a finely balanced process and such sensitivity would not be acceptable. Additionally, it is quite surprising, and unpredictable, that the combination of calcium hydroxide, especially without the presence of calcium oxide, and water and/or glycerin would have the observed and important controlled beneficial thickening effect. Use of Ca(OH)$_2$ would generally be considered to be unacceptable for present purposes, because typical polyesters used for SMC (sheet molding compound) with their high acid numbers of about 20-30 would be associated with excessive thickening by Ca(OH)$_2$ and a consequent inability to mold in a vacuum bag. While polyesters with acid numbers of 13.2 are disclosed (e.g. FIGS. 18, 19, 20) and an effect of acid number on viscosity (Table 32) is shown, the paper entitled "Thickeners and Low-Shrink Additives For Premix and SMC Systems" by F. Fekete (delivered at the 25th Annual Conference Technical Conference, 1970, The Society of the Plastics Industry, Inc.) does not disclose the low acid number resin contemplated herein and would appear to indicate, e.g. in Table I, an empirical, unpredictable behavior of alkaline earth metal compounds, and their amounts, when used as thickeners. Because of the few available acid thickening sites, in the low acid number polyester used herein, such a polyester could generally even be considered to be a non-thickenable polyester.

The woven glass roving is desirably made from fibers of a magnesia aluminosilicate glass. Magnesia aluminosilicate glass fibers used herein are high strength fibers and typically have a tensile strength in excess of about 500,000 psi. These fibers are roughly about two-thirds by weight silica, and typically on the order of about 65% by weight silica, and one-third being magnesia and alumina with the alumina being present in a greater amount than the magnesia. Typically alumina will be about 25% by weight and magnesia about 10% by weight for outstanding results. Best results are obtained when the fibers have a water resistant, size coating thereon which allows wetting of the fiber with the resin but which coating is not chemically reactive with the polyester resin. Preferred size coatings for use with the present polyesters for ballistic applications are sizes containing an epoxy based film former and an epoxy silane coupling agent along with other conventional materials. Such sizings allow stresses to be transferred to the fiber under normal rates of mechanical loading but allows the resin to debond from fibers under a rapid loading rate such as a ballistic event. Water resistance of the size can be tested by a boiling water test in which the fibers are immersed for about 2 hours and then dried. Fibers which retain at least about 80% of their original flexural strength possess sufficient water resistance. Debonding can be evaluated by a standard short beam shear test which measures interfacial shear strength. Interfacial shear strengths by the short beam shear test (ASTM D-2344) of less than about 5,000 psi preferably less than about 4,000 psi and most desirably less than about 2,000 psi will produce good results. One preferred roving is that made from S-2 glass and is commercially available from Owens-Corning Fiberglas Corporation with their sizing designation of 463. Outstanding results with a woven roving woven from this material and having a weight per unit area of about 24 ounces per square yard.

Adjuvants may, of course, be added to the impregnating composition. Fumed silica (e.g. Cab-O-Sil material) can be added to reduce flow in the final rolled package. Hydrated alumina (e.g. Solem 332 material) can be used to increase flame resistance without creating toxicity problems.

While the above sets forth the present invention so as to enable one skilled in the art to make and use same, nonetheless further exemplification follows.

EXAMPLE

A continuous polyethylene-nylon extruded film was supplied to a moving conveyor and, while on the plastic film, a magnesia aluminosilicate fiberglass woven roving was impregnated with a viscosity controlled impregnating composition to form a prepreg. The impregnating composition was first prepared by combining calcium hydroxide, 2,5-dimethyl-2,5-bis-(2-ethylhexanoylperoxy) hexane, water with a 55% by weight solution of an isophthalic-maleic-propylene glycol thermosettable polyester which was free of amine-accelerator (Owens-Corning Fiberglas Corporation E-701 having an acid number between about 7 and 12.5 in styrene solvent). The initiator noted above is commercially available under the designation Lupersol 256. About 100 parts by weight of the E-701 solution was employed, water was employed in an amount of about 0.1% (based on E-701 solution) and the Lupersol 256 peroxy initiator in an amount of about 0.5% (same basis). Substantially identical results are obtained by using 100 parts of a resin solution obtained by diluting E-780 with styrene to a level of about 45% by weight styrene. The source of the calcium hydroxide was a commercially available material PG-9104 which is a dispersion of about 30% by weight of a ctive calcium hydroxide in oligomeric styrene. The amount of PG-9104 was about 10 parts. The impregnating was done by dispensing the impregnating composition onto the coextruded film and then embedding woven roving into the viscosity controlled impregnating composition. The specific woven roving employed was that available from Owens-Corning Fiberglas under their designation OC 24 5X5.12P-463C.

The impregnating composition woven roving mass and the support film were then passed through two compression rollers to complete the impregnating step. The resin solution had a viscosity of about 300 to 1200 cps and the viscosity of the composition after being combined with the calcium hydroxide, the 2-5 initiator and the water increased substantially but was less than about 4000 cps during the impregnating, that is up to the time the materials left the compression rolls. The time which elapsed between combining the ingredients to form the impregnating composition and the release from the compression rolls was on the order of about 27 minutes. The material from the compression roll was then collected as a prepreg in the form of a roll. This took approximately another 10 minutes and after this length of time, the impregnating composition had a viscosity in excess of about 25000 cps. Release of the polyethylene film so that prepreg plies can be molded substantially immediately thereafter was easily effected. After the elapse of about one day from the time the prepreg was collected on the roll, the viscosity of the impregnating composition was on the order of about 300,000 to about 500,000 cps and had substantially leveled off at that point. Consequently the prepreg can be easily stored for prolonged periods of time, for example, 30 days or more and then molded if desired.

The molding, whether done substantially contemporaneous with the production of the prepreg or whether delayed for some convenient period of time was done using conventional vacuum bag molding techniques. That is, a sufficient number of plies of the prepreg were positioned in the vacuum bag molding unit and the prepregs then molded and cured to a final thermoset condition. Molding was done under vacuum and was first of all done by heating the prepregs to a temperature of about 140° to about 150° F. and holding the stacked plies of prepregs at that temperature for sufficient period of time to allow the prepreg (impregnating composition and roving) to flow and conform to the mold configuration. This was done, as previously indicated, without triggering the self-sustaining curing reaction which would inhibit resin flow. After that holding period the prepregs were heated and at a temperature of about 165° F. the high rate exothermic curing reaction took place. After completion of the reaction the materials were given an additional cure by heating at about 250° F. for about 2 hours.

The composites produced in this manner show low void volumes that is on the order of less than 4% by weight of voids. The vacuum was such that the absolute pressure on the laminate was not greater than about 14 psi. The composites had the outstanding ballistic resistant properties needed as well as all the mechanical properties needed, even when formed in thicknesses of on the order of 2 to 3 inches. The final articles contain about 60 to 75% by weight of glass and typically are formed from about 55 to about 80 plies of the woven roving prepreg.

Table I below shows some equally satisfactory impregnating compositions. Formulation 2 provides for improved tack and drape and Formulation 3 has enhanced flame retardant characteristics.

TABLE I

| | (Parts by Weight) | | |
|---|---|---|---|
| | 1 | 2 | 3 |
| E-780 | 83.3 | 100 | 100 |
| Styrene | 16.7 | 6.12 | — |
| Diallyl Phthalate | — | 7.48 | 14.55 |
| Hydrated Alumina | — | — | 40.1 |
| Alpha Methyl Styrene | 1.65 | — | — |
| Water | 0.05 | — | — |
| Glycerin | — | 0.5 | .572 |
| Cab-O-Sil | — | 1.0 | — |
| TBPB | — | 0.25 | 0.286 |
| 2-5 Initiator | 0.5 | 0.05 | .114 |
| PG 9104 | 10 | 3 | 2.86 |

Having described our invention it will, of course, be apparent that modifications are possible which pursuant to the patent statutes and laws do not depart from the spirit and scope thereof.

We claim:

1. A process for forming ballistic resistant composites, the process being capable of producing composites with less than about 4% by weight void volume, said process comprising: combining (i) calcium hydroxide, and (ii) 2,5-dimethyl-2,5-bis-(2-ethylhexanoylperoxy)-hexane initiator, and, optionally (iii) tertiary butyl perbenzoate initiator and (iv) water or glycerine or mixtures of water and glycerin, and optionally (v) alphamethyl styrene, with (vi) a resin solution of an isophthalic-maleicpropylene glycol polyester in a solvent of styrene or a solvent mixture of styrene and diallyl phthalate to thereby form a viscosity controlled impregnating composition said solution being free of amine accelerators; while on a plastic film, impregnating a magnesium aluminosilicate fiber glass woven roving with said viscosity controlled impregnating composition to thereby form a prepreg; collecting said prepreg on a roll; removing prepreg from said roll and stacking a plurality of plies of said prepreg material in a vacuum bag molding unit; heating said plies under vacuum in said mold unit to a temperature of about 140° to 150° F. and holding said plies at that temperature for a sufficient period of time to allow said impregnating composition to flow and substantially conform to the mold configuration but without substantially initiating the cross-linking reaction; further heating the plies of prepreg in said molding unit to a temperature of about 165° F. whereby an exothermic cross-linking reaction is initiated; allowing the cross-linking reaction to proceed and curing the molded plies by heating at a temperature and for a sufficient period of time to substantially complete the curing; said isophthalic-maleicpropylene glycol polyester having an acid number of less than about 12.5; the amount of calcium hydroxide, and water or glycerin or mixture of water and glycerin which are combined with said polyester solution being between about 0.5% to about 4% by weight calcium hydroxide and about 0.02% to about 1% of water or glycerin or mixtures of water and glycerin, said amounts being sufficient such that the impregnating composition will have (i) a viscosity in excess of about 500 and up to about 4000 cps during said impregnating, and (ii) a viscosity of in excess of about 15,000 cps within no more than about 10 minutes after impregnation, and (iii) a viscosity of in excess of between about 50,000 and up to about 500,000 cps after the elapse of about no more than about one day after said roll is collected, and (iv) a viscosity of about 3,000 to about 10,000 cps when heated for molding to between about 140° F. to about 150° F.; the total amount of initiator present in the impregnating composition being an amount of at least about 0.05% by weight but less than about 1.0% by weight (based on resin solution); the amount of impregnating composition employed being sufficient to produce a composite containing about 60 to about 75% by weight of glass, and the number of prepreg plies being sufficient to provide a final composite thickness of at least about ⅛ inch.

2. The process of claim 1 wherein the amounts of calcium hydroxide, and water and/or glycerin, are sufficient to provide said viscosity of in excess of about 15000 cps within no more than about 37 minutes from the time of combining the ingredients to from said viscosity controlled impregnating composition.

3. The process of claim 2 wherein the thickness of the composite is at least ½ inch.

4. The process of claim 2 wherein both of said initiators are combined.

5. The process of claim 3 wherein the thickness is in excess of about ¾ inch and wherein the total initiator present in the impregnating solution is about 0.05% to about 0.5%.

6. The process of claim 2 wherein said woven roving has a weight per unit area of 24 ounces per square yard and said fibers have a size containing an epoxy film former and an epoxysilane coupling agent.

7. The process of claim 2 wherein the resin solution contains about 53% to about 70% by weight of resin.

8. The process of claim 7 wherein said solution of said polyester has a viscosity of about 300 to about 1500 cps.

9. The process of claim 1 wherein said viscosity controlled impregnating composition is substantially free of calcium oxide.

10. A process for forming a prepreg material which is adapted to be vacuum bag molded into thick ballistic resistant composites, the process comprising: combining (i) calcium hydroxide, and (ii) 2,5-dimethyl-2,5-bis-(2-ethylhexanoylperoxy) hexane initiator (ii), and, optionally tertiary butyl perbenzoate and (iv) water or glycerin or mixtures of water and glycerin (v), and optionally alphamethyl styrene, with (vi) a solution of an isophthalic-maleic-propylene glycol polyester in a solvent of styrene or a solvent mixture of styrene and diallyl phthalate to thereby form a viscosity controlled impregnating composition, said polyester having an acid number of less than about 12.5; while on a plastic film, impregnating a magnesia aluminosilicate fiber glass woven roving with said viscosity controlled impregnating composition to thereby form a prepreg; collecting said prepreg on a roll; the amount of calcium hydroxide and water or glycerin or mixture of water and glycerin which is combined with said polyester solution being between about 0.5% to about 4% by weight calcium hydroxide and about 0.02% to about 1% of water or glycerin or mixtures of water and glycerin, said amounts being sufficient such that the impregnating composition will have (i) a viscosity in excess of about 500 and up to about 4,000 cps during said impregnating, and (ii) a viscosity of in excess of about 15,000 cps within no more than about 10 minutes after impregnating, and (iii) a viscosity of in excess of between about 50,000 and up to about 500,000 cps after the elapse of about no more than about one day after said roll is collected, and (iv) a viscosity of about 3,000 to about 10,000 cps when heated for molding to between about 140° F. to about 150° F.; the total amount of total initiators present in the impregnating solution being at least about 0.05% by weight up to about 1.0% by weight; the amount of impregnating composition employed being sufficient upon final curing of the polyester to produce a composite containing about 60 to about 75% by weight of glass, said impregnated roving having a cross linking initiation temperature of about 165° F. and said impregnated roving when vacuum bag molded being capable of flowing and conforming to the mold in the temperature range of about 140°–150° F.

11. The process of claim 1 wherein said viscosity controlled impregnating composition consists essentially of said ingredients (i), (ii), (iv), (vi) and optionally ingredients (iii) and (v).

12. The process of claim 10 wherein said viscosity controlled impregnating composition consists essentially of said ingredients (i), (ii), (iv), (vi) and optionally ingredients (iii) and (v).

13. The process of claim 11 wherein said viscosity of said impregnating composition of an excess of between about 50,000 and up to 500,000 cps after the elapse of no more than about one day after said roll is collected remains substantially constant over about a 30-day period.

14. The process of claim 12 wherein said viscosity in excess of between about 50,000 and up to about 500,000 cps after the elapse of no more than one day after said roll is collected is substantially constant over about a 30-day period.

* * * * *